US012614652B2

(12) United States Patent
Mou et al.

(10) Patent No.: US 12,614,652 B2
(45) Date of Patent: Apr. 28, 2026

(54) NEODYMIUM-IRON-BORON MAGNETIC MATERIAL, PREPARATION METHOD THEREFOR AND APPLICATION THEREOF

(71) Applicant: FUJIAN GOLDEN DRAGON RARE-EARTH Co., Ltd., Fujian (CN)

(72) Inventors: Weiguo Mou, Fujian (CN); Jiaying Huang, Fujian (CN)

(73) Assignee: FUJIAN GOLDEN DRAGON RARE-EARTH Co., Ltd., Fujian (CN)

( * ) Notice: Subject to any disclaimer, the term of this patent is extended or adjusted under 35 U.S.C. 154(b) by 492 days.

(21) Appl. No.: 17/636,931

(22) PCT Filed: Jul. 7, 2020

(86) PCT No.: PCT/CN2020/100571
§ 371 (c)(1),
(2) Date: Feb. 21, 2022

(87) PCT Pub. No.: WO2021/063061
PCT Pub. Date: Apr. 8, 2021

(65) Prior Publication Data

US 2022/0359107 A1 Nov. 10, 2022

(30) Foreign Application Priority Data

Sep. 30, 2019 (CN) ........................ 201910943538.9

(51) Int. Cl.
*H01F 1/057* (2006.01)
*C22C 38/00* (2006.01)
(Continued)

(52) U.S. Cl.
CPC ......... *H01F 1/0571* (2013.01); *C22C 38/002* (2013.01); *C22C 38/005* (2013.01);
(Continued)

(58) Field of Classification Search
CPC ..... C22C 38/005; C22C 38/002; C22C 38/10; C22C 38/12; C22C 38/14; C22C 38/16;
(Continued)

(56) References Cited

U.S. PATENT DOCUMENTS

2001/0023716 A1* 9/2001 Hirosawa .............. H01F 1/0577 148/302
2017/0098496 A1* 4/2017 Sun ........................... B22F 3/16
2020/0176155 A1* 6/2020 Masuda ................ C22C 38/002

FOREIGN PATENT DOCUMENTS

CN 103903824 A 7/2014
CN 103996524 * 8/2014
(Continued)

OTHER PUBLICATIONS

Oct. 15, 2020 International Search Report issued in International Patent Application No. PCT/CN2020/100571.
(Continued)

*Primary Examiner* — Nicholas A Wang
(74) *Attorney, Agent, or Firm* — Houston Beshining Law Office PLLC; Liangang Ye

(57) ABSTRACT

A neodymium-iron-boron magnetic material, a preparation method therefor and an application thereof. The neodymium-iron-boron magnetic material comprises the following components in percentage by mass: 29.5-31.5 wt. % of R, where RH>1.5 wt. %; 0.05-0.25 wt. % of Cu; 0.42-2.6 wt. % of Co; 0.20-0.3 wt. % of Ga; 0.25-0.3 wt. % of N; 0.46-0.6 wt. % of Al, or alternatively Al is less than or equal to 0.04 wt. % but is not 0; 0.98-1 wt. % of B; and 64-68 wt. % of Fe; wherein R is a rare-earth element and comprises Nd and RH, RH is a heavy rare-earth element and comprises Tb, and a mass ratio of Tb to Co is less than or equal to 15 but is not 0. The neodymium-iron-boron magnetic material has higher Hcj and Br, and lower absolute values of temperature coefficients of Br and Hcj.

6 Claims, 1 Drawing Sheet

(51) Int. Cl.

| | |
|---|---|
| ***C22C 38/06*** | (2006.01) |
| ***C22C 38/10*** | (2006.01) |
| ***C22C 38/12*** | (2006.01) |
| ***C22C 38/14*** | (2006.01) |
| ***C22C 38/16*** | (2006.01) |

(52) U.S. Cl.
CPC .............. *C22C 38/06* (2013.01); *C22C 38/10* (2013.01); *C22C 38/12* (2013.01); *C22C 38/14* (2013.01); *C22C 38/16* (2013.01)

(58) Field of Classification Search
CPC ..... C22C 2202/02; C22C 38/04; C22C 28/00; C22C 30/00; C22C 33/04; C22C 38/02; C22C 38/06; C22C 33/0278; C22C 38/32; C22C 33/0207; C22C 33/0257; C22C 38/007; C22C 38/008; C22C 38/08; C22C 38/105; C22C 38/20; C22C 38/22; C22C 38/24; C22C 38/26; C22C 38/28; C22C 38/30; C22C 38/42; C22C 38/44; C22C 38/46; C22C 38/48; C22C 38/50; C22C 38/52; C22C 38/54; C22C 38/60; C22C 33/02; H01F 1/0577; H01F 41/0266; H01F 41/0253; H01F 1/057; H01F 41/0293; H01F 1/0571; H01F 1/0573; H01F 1/0576; H01F 41/00; H01F 41/0273
See application file for complete search history.

(56) References Cited

FOREIGN PATENT DOCUMENTS

| | | | | |
|---|---|---|---|---|
| CN | 103996524 | A | | 8/2014 |
| CN | 104240886 | A | | 12/2014 |
| CN | 104252939 | | * | 12/2014 |
| CN | 105206366 | | * | 12/2015 |
| CN | 105655076 | A | | 6/2016 |
| CN | 106782974 | A | | 5/2017 |
| CN | 107393711 | A | | 11/2017 |
| CN | 108831650 | | * | 11/2018 |
| CN | 108831650 | A | | 11/2018 |
| CN | 110556223 | A | | 12/2019 |
| JP | 2006295139 | | * | 10/2006 |
| JP | 2009302318 | A | | 12/2009 |
| JP | 2014027268 | A | | 2/2014 |

OTHER PUBLICATIONS

Sep. 29, 2020 Written Opinion of the International Searching Authority issued in International Patent Application No. PCT/CN2020/100571.

* cited by examiner

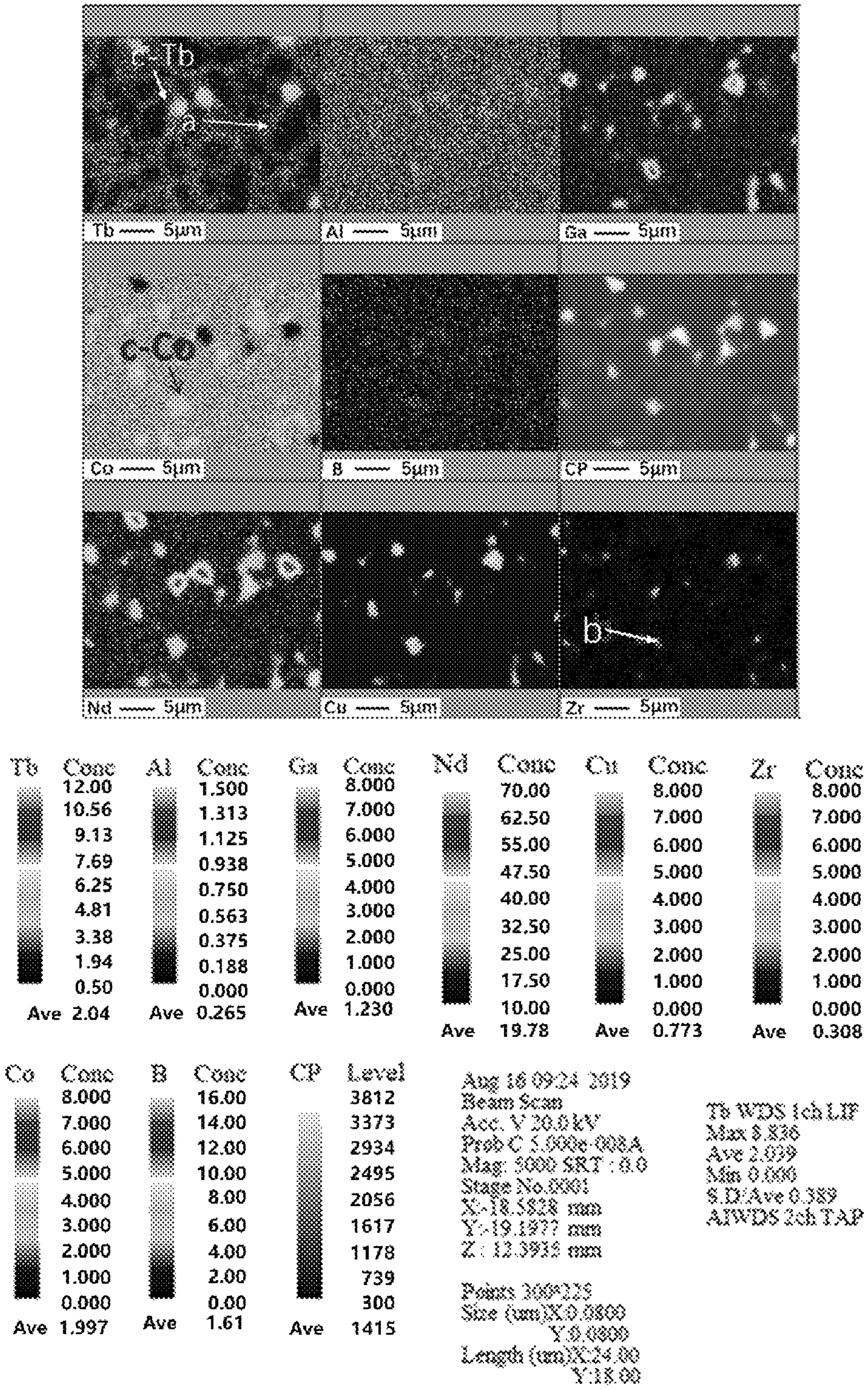
c-Tb
a
Tb 5μm
Al 5μm
Ga 5μm
c-Co
Co 5μm
B 5μm
CP 5μm
b
Nd 5μm
Cu 5μm
Zr 5μm
Tb Conc 12.00 10.56 9.13 7.69 6.25 4.81 3.38 1.94 0.50 Ave 2.04
Al Conc 1.500 1.313 1.125 0.938 0.750 0.563 0.375 0.188 0.000 Ave 0.265
Ga Conc 8.000 7.000 6.000 5.000 4.000 3.000 2.000 1.000 0.000 Ave 1.230
Nd Conc 70.00 62.50 55.00 47.50 40.00 32.50 25.00 17.50 10.00 Ave 19.78
Cu Conc 8.000 7.000 6.000 5.000 4.000 3.000 2.000 1.000 0.000 Ave 0.773
Zr Conc 8.000 7.000 6.000 5.000 4.000 3.000 2.000 1.000 0.000 Ave 0.308
Co Conc 8.000 7.000 6.000 5.000 4.000 3.000 2.000 1.000 0.000 Ave 1.997
B Conc 16.00 14.00 12.00 10.00 8.00 6.00 4.00 2.00 0.00 Ave 1.61
CP Level 3812 3373 2934 2495 2056 1617 1178 739 300 Ave 1415
Aug 16 09:24 2019
Beam Scan
Acc. V 20.0 kV
Mag. 5000
Stage No.0001
Points 300*225
Size (um)X 0.0800
Y 0.0800
Length (um)X 24.00
Y 18.00
Tb WDS 1ch LIF
Max 8.836
Ave 2.039
Min 0.000

NEODYMIUM-IRON-BORON MAGNETIC MATERIAL, PREPARATION METHOD THEREFOR AND APPLICATION THEREOF

The present application is a National Stage of International Application No. PCT/CN2020/100571, filed on Jul. 7, 2020, which claims priority of the Chinese Patent Application No. CN201910943538.9 filed on Sep. 30, 2019, the contents of which are incorporated herein by reference in their entireties.

TECHNICAL FIELD

The present disclosure specifically relates to a neodymium-iron-boron magnetic material, a preparation method therefor and an application thereof.

BACKGROUND

Neodymium iron boron (Nd—Fe—B) magnetic materials with $Nd_2Fe_{14}B$ as the main component have a relatively high residual magnetic flux density (Br), intrinsic coercivity (Hcj) and maximum magnetic energy product (BHmax), and have an excellent comprehensive magnetic performance, and they have been used in drive motors for new energy vehicles, air conditioner compressors, industrial servo motors, etc. Neodymium-iron-boron materials have a low Curie temperature point and poor temperature stability, and cannot meet the requirements of high operating temperatures (>200° C.) in many new application fields.

At present, the Br of sintered Nd—Fe—B permanent magnetic materials has been close to 90% or more of the theoretical value of the magnetic properties, while the Hcj of the sintered Nd—Fe—B permanent magnetic materials is only 12% of the anisotropic field of $Nd_2Fe_{14}B$. It can be seen that the Hcj of the sintered Nd—Fe—B permanent magnetic materials has a relatively great potential for improvement. A large number of studies have shown that the Hcj of Nd—Fe—B permanent magnetic materials is relatively sensitive to the microstructure of the magnet. During production, it is common to add the heavy rare earth Dy or Tb to replace Nd in order to improve the anisotropic field of the magnet. In the prior art, adding an appropriate amount of heavy rare earth metal can improve the Hcj; however, the degree of improvement is limited. Although the Hcj is improved when too much heavy metal is added, the Br will be greatly reduced. A suitable amount of addition has not yet been found to maintain a relatively high Br while increasing the Hcj to a greater extent.

Therefore, selecting an appropriate heavy rare earth metal addition amount and an appropriate addition method to increase both the Hcj and Br of a magnet has become an urgent technical problem to be solved.

Content of the Present Invention

The technical problem to be solved by the present disclosure is to provide a neodymium-iron-boron magnetic material, a preparation method therefor and an application thereof, in order to overcome the defect of relatively low Hcj of a neodymium-iron-boron magnetic material obtained from a neodymium-iron-boron magnet in the prior art. The Hcj and Br of the neodymium-iron-boron magnetic material of the present application are both relatively high, and the absolute value of the temperature coefficient of Br and the absolute value of the temperature coefficient of Hcj are relatively low.

The present disclosure solves the above-mentioned technical problem by means of the following technical solutions.

The present disclosure provides a neodymium-iron-boron magnetic material, comprising, by mass percentage, the following components:

29.5-31.5 wt. % of R, with RH>1.5 wt. %;

0.05-0.25 wt. % of Cu, 0.42-2.6 wt. % of Co, 0.20-0.3 wt. % of Ga, 0.25-0.3 wt. % of N, including one or more of Zr, Nb, Hf and Ti, 0.46-0.6 wt. % of Al or Al<0.04 wt. %, exclusive of 0 wt. %, 0.98-1 wt. % of B, 64-68 wt. % of Fe, wherein R is a rare earth element and includes at least Nd and RH, and RH is a heavy rare earth element and includes Tb; and the mass ratio of Tb to Co is less than or equal to 15, exclusive of 0.

In the present disclosure, the content of R is preferably 30.15-31 wt. %, e.g. 30.1-30.6 wt. %, more preferably 30.4-30.5 wt. %, e.g. 30.42 wt. % or 30.48 wt. %, with the percentage referring to the mass percentage relative to the neodymium-iron-boron magnetic material.

In the present disclosure, R may also include light rare earth elements conventional in the art, e.g. Pr.

In the present disclosure, the content of Nd is preferably 27-28 wt. %, e.g. 27.13 wt. % or 27.44 wt. %, with the percentage referring to the mass percentage relative to the neodymium-iron-boron magnetic material.

In the present disclosure, the mass percentage of RH in R is 9.7-13 wt. %, more preferably 9.7-11 wt. %, preferably 9.7 wt. %.

In the present disclosure, the content of RH is preferably 2.8-4 wt. %, more preferably 2.9-3.4 wt. %, e.g. 2.98 wt. % or 3.35 wt. %, with the percentage referring to the mass percentage relative to the neodymium-iron-boron magnetic material.

In the present disclosure, the content of Cu is preferably 0.05-0.16 wt. %, e.g. 0.05 wt. % or 0.15 wt. %, with the percentage referring to the mass percentage relative to the neodymium-iron-boron magnetic material.

In the present disclosure, the content of Co is preferably 1.48-2.7 wt. %, e.g. 1.49 wt. %, 1.51 wt. % or 2.6 wt. %, preferably 1.49-1.51 wt. %, with the percentage referring to the mass percentage relative to the neodymium-iron-boron magnetic material.

In the present disclosure, the content of Ga is preferably 0.2-0.26 wt. %, e.g. 0.2 wt. % or 0.25 wt. %, with the percentage referring to the mass percentage relative to the neodymium-iron-boron magnetic material.

In the present disclosure, the content of N is preferably 0.26-0.3 wt. %, e.g. 0.26 wt. %, 0.27 wt. % or 0.3 wt. %, with the percentage referring to the mass percentage relative to the neodymium-iron-boron magnetic material.

In the present disclosure, the type of N is preferably one or more of Zr, Nb, Hf and Ti, e.g. Zr and/or Ti.

In the present disclosure, the content of Al is preferably 0.46-0.5 wt. % or 0.02-0.04 wt. %, e.g. 0.03 wt. %, 0.45 wt. % or 0.46 wt. %, with the percentage referring to the mass percentage relative to the neodymium-iron-boron magnetic material.

In the present disclosure, the content of B is preferably 0.98-0.99 wt. %, more preferably 0.99 wt. %, with the percentage referring to the mass percentage relative to the neodymium-iron-boron magnetic material.

In the present disclosure, the content of Fe is preferably 64-66 wt. %, e.g. 64.86 wt. %, 65.7 wt. %, 65.72 wt. % or 65.74 wt. %, with the percentage referring to the mass percentage relative to the neodymium-iron-boron magnetic material.

In the present disclosure, the mass ratio of Tb to Co is preferably (1-15):1, e.g. 3.35:1.49 or 2:1, more preferably (1-3):1.

In the present disclosure, the neodymium-iron-boron magnetic material preferably further comprises Mn.

The content of Mn is preferably less than or equal to 0.035 wt. %, exclusive of 0 wt. %, preferably 0.01-0.035 wt. %, e.g. 0.03 wt. %, with the percentage referring to the mass percentage relative to the neodymium-iron-boron magnetic material.

In the present disclosure, the neodymium-iron-boron magnetic material comprises, by mass percentage, the following components: 27-28 wt. % of Nd, 2.8-4 wt. % of Tb, 0.05-0.16 wt. % of Cu, 1.48-2.7 wt. % of Co, 0.2-0.26 wt. % of Ga, 0.25-0.3 wt. % of N, 0.46-0.5 wt. % or 0.02-0.04 wt. % of Al, 0.98-0.99 wt. % of B, and 64-66 wt. % of Fe, with the percentage referring to the mass percentage relative to the neodymium-iron-boron magnetic material, wherein N is Zr and/or Ti; Tb accounts for 9.7-13 wt. % of the total mass of Nd and Tb, and the mass ratio of Tb to Co is (1-15):1.

In the present disclosure, the neodymium-iron-boron magnetic material comprises, by mass percentage, the following components: 27-28 wt. % of Nd, 2.8-4 wt. % of Tb, 0.05-0.16 wt. % of Cu, 1.48-2.7 wt. % of Co, 0.2-0.26 wt. % of Ga, 0.25-0.3 wt. % of N, 0.46-0.5 wt. % or 0.02-0.04 wt. % of Al, 0.98-0.99 wt. % of B, 64-66 wt. % of Fe, and 0.01-0.035 wt. % of Mn, with the percentage referring to the mass percentage relative to the neodymium-iron-boron magnetic material, wherein N is Zr and/or Ti; Tb accounts for 9.7-13 wt. % of the total mass of Nd and Tb, and the mass ratio of Tb to Co is (1-15):1.

In the present disclosure, the neodymium-iron-boron magnetic material comprises, by mass percentage, the following components: 27-28 wt. % of Nd, 2.9-3.4 wt. % of Tb, 0.05-0.16 wt. % of Cu, 1.48-2.7 wt. % of Co, 0.2-0.26 wt. % of Ga, 0.26-0.3 wt. % of N, 0.46-0.5 wt. % or 0.02-0.04 wt. % of Al, 0.98-0.99 wt. % of B, and 64-66 wt. % of Fe, with the percentage referring to the mass percentage relative to the neodymium-iron-boron magnetic material, wherein N is Zr and/or Ti; Tb accounts for 9.7-11 wt. % of the total mass of Nd and Tb, and the mass ratio of Tb to Co is (1-3):1.

In the present disclosure, the neodymium-iron-boron magnetic material comprises, by mass percentage, the following components: 27-28 wt. % of Nd, 2.9-3.4 wt. % of Tb, 0.05-0.16 wt. % of Cu, 1.48-2.7 wt. % of Co, 0.2-0.26 wt. % of Ga, 0.26-0.3 wt. % of N, 0.46-0.5 wt. % or 0.02-0.04 wt. % of Al, 0.98-0.99 wt. % of B, 64-66 wt. % of Fe, and 0.01-0.035 wt. % of Mn, with the percentage referring to the mass percentage relative to the neodymium-iron-boron magnetic material, wherein N is Zr and/or Ti; Tb accounts for 9.7-11 wt. % of the total mass of Nd and Tb, and the mass ratio of Tb to Co is (1-3):1.

In the present disclosure, the neodymium-iron-boron magnetic material is preferably composed of, by mass percentage, the following components: 27.44 wt. % of Nd, 2.98 wt. % of Tb, 0.15 wt. % of Cu, 1.49 wt. % of Co, 0.25 wt. % of Ga, 0.27 wt. % of Zr, 0.46 wt. % of Al, 0.99 wt. % of B, and 65.72 wt. % of Fe, with the percentage referring to the mass percentage relative to the neodymium-iron-boron magnetic material, with the balance being inevitable impurities.

In the present disclosure, the neodymium-iron-boron magnetic material is preferably composed of, by mass percentage, the following components: 27.13 wt. % of Nd, 3.35 wt. % of Tb, 0.15 wt. % of Cu, 1.49 wt. % of Co, 0.25 wt. % of Ga, 0.26 wt. % of Zr, 0.45 wt. % of Al, 0.99 wt. % of B, and 65.74 wt. % of Fe, with the percentage referring to the mass percentage relative to the neodymium-iron-boron magnetic material, with the balance being inevitable impurities.

In the present disclosure, the neodymium-iron-boron magnetic material is preferably composed of, by mass percentage, the following components: 27.44 wt. % of Nd, 2.98 wt. % of Tb, 0.15 wt. % of Cu, 1.49 wt. % of Co, 0.25 wt. % of Ga, 0.27 wt. % of Ti, 0.46 wt. % of Al, 0.99 wt. % of B, and 65.70 wt. % of Fe, with the percentage referring to the mass percentage relative to the neodymium-iron-boron magnetic material, with the balance being inevitable impurities.

In the present disclosure, the neodymium-iron-boron magnetic material is preferably composed of, by mass percentage, the following components: 27.44 wt. % of Nd, 2.98 wt. % of Tb, 0.15 wt. % of Cu, 1.49 wt. % of Co, 0.25 wt. % of Ga, 0.27 wt. % of Zr, 0.46 wt. % of Al, 0.99 wt. % of B, 65.72 wt. % of Fe, and 0.03 wt. % of Mn, with the percentage referring to the mass percentage relative to the neodymium-iron-boron magnetic material, with the balance being inevitable impurities.

In the present disclosure, the neodymium-iron-boron magnetic material is preferably composed of, by mass percentage, the following components: 27.44 wt. % of Nd, 2.98 wt. % of Tb, 0.15 wt. % of Cu, 2.6 wt. % of Co, 0.25 wt. % of Ga, 0.27 wt. % of Zr, 0.46 wt. % of Al, 0.99 wt. % of B, and 64.86 wt. % of Fe, with the percentage referring to the mass percentage relative to the neodymium-iron-boron magnetic material.

In the present disclosure, the neodymium-iron-boron magnetic material is preferably composed of, by mass percentage, the following components: 27.44 wt. % of Nd, 2.98 wt. % of Tb, 0.15 wt. % of Cu, 1.49 wt. % of Co, 0.25 wt. % of Ga, 0.3 wt. % of Zr, 0.46 wt. % of Al, 0.99 wt. % of B, and 65.72 wt. % of Fe, with the percentage referring to the mass percentage relative to the neodymium-iron-boron magnetic material, with the balance being inevitable impurities.

In the present disclosure, the neodymium-iron-boron magnetic material is preferably composed of, by mass percentage, the following components: 27.44 wt. % of Nd, 2.98 wt. % of Tb, 0.15 wt. % of Cu, 1.49 wt. % of Co, 0.25 wt. % of Ga, 0.27 wt. % of Zr, 0.03 wt. % of Al, 0.99 wt. % of B, and 65.72 wt. % of Fe, with the percentage referring to the mass percentage relative to the neodymium-iron-boron magnetic material, with the balance being inevitable impurities.

In the present disclosure, the neodymium-iron-boron magnetic material is preferably composed of, by mass percentage, the following components: 27.44 wt. % of Nd, 2.98 wt. % of Tb, 0.05 wt. % of Cu, 1.49 wt. % of Co, 0.25 wt. % of Ga, 0.27 wt. % of Zr, 0.46 wt. % of Al, 0.99 wt. % of B, and 65.72 wt. % of Fe, with the percentage referring to the mass percentage relative to the neodymium-iron-boron magnetic material, with the balance being inevitable impurities.

In the present disclosure, the neodymium-iron-boron magnetic material is preferably composed of, by mass percentage, the following components: 27.44 wt. % of Nd, 2.98 wt. % of Tb, 0.15 wt. % of Cu, 1.49 wt. % of Co, 0.2 wt. % of Ga, 0.27 wt. % of Zr, 0.46 wt. % of Al, 0.99 wt. % of B, and 65.72 wt. % of Fe, with the percentage referring to the mass percentage relative to the neodymium-iron-boron magnetic material, with the balance being inevitable impurities.

In the present disclosure, preferably, Tb is distributed at the grain boundary and the central portion of grains in the neodymium-iron-boron magnetic material; preferably, the content of Tb distributed at the grain boundary is higher than the content of Tb distributed in the central portion of the grains. The expression "at the crystal" refers to the separation between two main phases.

In the present disclosure, preferably, N is distributed at the grain boundary.

In the present disclosure, preferably, Co is distributed in a grain boundary triangular region.

In the present disclosure, preferably, in the grain boundary triangular region of the neodymium-iron-boron magnetic material, the distribution of Tb does not overlap the distribution of Co.

In the present disclosure, those skilled in the art would be aware that the grain boundary triangular region refers to a gap formed between three grains, and the grains refer to the grains of the neodymium-iron-boron magnetic material.

In the present disclosure, those skilled in the art would be aware that Nd is neodymium, Fe is ferrum, B is boron, Tb is terbium, Co is cobalt, Cu is cuprum, Ga is gallium, Al is aluminum, Mn is manganese, Zr is zirconium, Ti is titanium, Nb is niobium, and Hf is hafnium.

The present disclosure further provides a primary alloy for preparing a neodymium-iron-boron magnetic material, wherein the composition of the primary alloy is $Nd_a$—$Fe_b$—$B_c$—$Tb_d$—$Co_e$—$Cu_f$—$Ga_g$—$Al_x$—$Mn_y$—$N_h$, wherein a, b, c, d, e, f, g, h, x and y refer to the mass fraction of each element in the primary alloy, a is 26-30 wt. %, b is 64-68 wt. %, c is 0.96-1.1 wt. %, d is 0.5-5 wt. %, e is 0.5-2.6 wt. %, f is 0.05-0.3 wt. %, g is 0.05-0.3 wt. %, x is less than or equal to 0.04 wt. %, exclusive of 0 wt. %, or 0.46-0.6 wt. %, y is 0-0.04 wt. %, and h is 0.2-0.5 wt. %, with the percentage referring to the mass percentage relative to the primary alloy.

In the present disclosure, a is preferably 28-29 wt. %, e.g. 28.46 wt. %, with the percentage referring to the mass percentage relative to the primary alloy.

In the present disclosure, b is preferably 65.5-67.5 wt. %, e.g. 65.62 wt. %, 66.63 wt. %, 66.7 wt. %, 66.73 wt. %, 66.78 wt. %, 66.83 wt. % or 67.16 wt. %, with the percentage referring to the mass percentage relative to the primary alloy.

In the present disclosure, c is preferably 0.98-1 wt. %, e.g. 0.99 wt. %, with the percentage referring to the mass percentage relative to the primary alloy.

In the present disclosure, d is preferably 1-1.5 wt. %, more preferably 1.1-1.3 wt. %, e.g. 1.2 wt. % or 1.3 wt. %, with the percentage referring to the mass percentage relative to the primary alloy.

In the present disclosure, e is preferably 1.4-2.6 wt. %, e.g. 1.49 wt. % or 2.6 wt. %, with the percentage referring to the mass percentage relative to the primary alloy.

In the present disclosure, f is preferably 0.05-0.16 wt. %, e.g. 0.05 wt. % or 0.15 wt. %, with the percentage referring to the mass percentage relative to the primary alloy.

In the present disclosure, g is preferably 0.1-0.25 wt. %, e.g. 0.2 wt. % or 0.25 wt. %, with the percentage referring to the mass percentage relative to the primary alloy.

In the present disclosure, h is preferably 0.25-0.3 wt. %, e.g. 0.27 wt. % or 0.3 wt. %, with the percentage referring to the mass percentage relative to the primary alloy.

In the present disclosure, x is preferably 0.02-0.04 wt. % or 0.45-0.47 wt. %, e.g. 0.03 wt. % or 0.46 wt. %, with the percentage referring to the mass percentage relative to the primary alloy.

In the present disclosure, y is preferably 0.02-0.04 wt. %, e.g. 0.03 wt. %, with the percentage referring to the mass percentage relative to the primary alloy.

In the present disclosure, the composition of the primary alloy is preferably $Nd_a$—$Fe_b$—$B_c$—$Tb_d$—$Co_e$—$Cu_f$—$Ga_g$—$Al_x$—$Mn_y$—$N_h$, wherein a, b, c, d, e, f, g, h, x and y refer to the mass fraction of each element in the primary alloy, a is 28-29 wt. %, b is 65.5-67.5 wt. %, c is 0.98-1 wt. %, d is 1-1.5 wt. %, e is 1.4-2.6 wt. %, f is 0.05-0.16 wt. %, g is 0.1-0.25 wt. %, x is 0.02-0.04 wt. % or 0.45-0.47 wt. %, y is 0.02-0.04 wt. %, and h is 0.25-0.3 wt. %, with the percentage referring to the mass percentage relative to the primary alloy.

In the present disclosure, the composition of the primary alloy is preferably $Nd_{28.46}Fe_{66.73}B_{0.99}Tb_{1.2}Co_{1.49}Cu_{0.15}Ga_{0.25}Zr_{0.27}Al_{0.46}$, wherein the numerical value of the subscript is the mass percentage of each element in the primary alloy.

In the present disclosure, the composition of the primary alloy is preferably $Nd_{28.46}Fe_{66.63}B_{0.99}Tb_{1.3}Co_{1.49}Cu_{0.15}Ga_{0.25}Zr_{0.27}Al_{0.46}$, wherein the numerical value of the subscript is the mass percentage of each element in the primary alloy.

In the present disclosure, the composition of the primary alloy is preferably $Nd_{28.46}Fe_{66.73}B_{0.99}Tb_{1.2}Co_{1.49}Cu_{0.15}Ga_{0.25}Ti_{0.27}Al_{0.46}$, wherein the numerical value of the subscript is the mass percentage of each element in the primary alloy.

In the present disclosure, the composition of the primary alloy is preferably $Nd_{28.46}Fe_{66.7}B_{0.99}Tb_{1.2}Co_{1.49}Cu_{0.15}Ga_{0.25}Zr_{0.27}Al_{0.46}Mn_{0.03}$, wherein the numerical value of the subscript is the mass percentage of each element in the primary alloy.

In the present disclosure, the composition of the primary alloy is preferably $Nd_{28.46}Fe_{65.62}B_{0.99}Tb_{1.2}Co_{2.6}Cu_{0.15}Ga_{0.25}Zr_{0.27}Al_{0.46}$, wherein the numerical value of the subscript is the mass percentage of each element in the primary alloy.

In the present disclosure, the composition of the primary alloy is preferably $Nd_{28.46}Fe_{67.16}B_{0.99}Tb_{1.2}Co_{1.49}Cu_{0.15}Ga_{0.25}Zr_{0.27}Al_{0.03}$, wherein the numerical value of the subscript is the mass percentage of each element in the primary alloy.

In the present disclosure, the composition of the primary alloy is preferably $Nd_{28.46}Fe_{66.83}B_{0.99}Tb_{1.2}Co_{1.49}Cu_{0.05}Ga_{0.25}Zr_{0.27}Al_{0.46}$, wherein the numerical value of the subscript is the mass percentage of each element in the primary alloy.

In the present disclosure, the composition of the primary alloy is preferably $Nd_{28.46}Fe_{66.78}B_{0.99}Tb_{1.2}Co_{1.49}Cu_{0.15}Ga_{0.2}Zr_{0.27}Al_{0.46}$, wherein the numerical value of the subscript is the mass percentage of each element in the primary alloy.

In the present disclosure, the preparation method for the primary alloy can be a conventional preparation method in the art, and usually involves: (1) preparing a primary alloy solution containing the above-mentioned components; and (2) passing the primary alloy solution through rotating rollers and cooling same to form a primary alloy casting strip.

In step (2), the cooling is generally cooling to 700-900° C.

In step (2), after being formed, the primary alloy casting strip is generally collected by means of a collector and cooled to 50° C. or less.

The present disclosure further provides an auxiliary alloy for preparing a neodymium-iron-boron magnetic material, wherein the composition of the auxiliary alloy is $Nd_i$—$Fe_j$—$B_k$—$Tb_l$—$Co_m$—$Cu_n$—$Ga_o$—$Al_r$—$Mn_t$—$N_p$, wherein i, j, k, l, m, n, o, p, r and t refer to the mass fraction of each element in the auxiliary alloy, i is 5-30 wt. %, j is 59-65 wt. %, k is 0.98-1 wt. %, 1 is 5-25 wt. %, m is 0.5-2.7 wt. %, n is 0.05-0.3 wt. %, o is 0.05-0.3 wt. %, r is less than or equal to 0.04 wt. %, exclusive of 0 wt. %, or 0.46-0.6 wt. %, t is 0-0.04 wt. %, and p is 0-0.5 wt. %, with the percentage referring to the mass percentage relative to the auxiliary alloy.

In the present disclosure, i is preferably 15-25 wt. %, more preferably 19-21 wt. %, e.g. 20 wt. %, with the percentage referring to the mass percentage relative to the auxiliary alloy.

In the present disclosure, j is preferably 59-61 wt. %, e.g. 59.25 wt. %, 60.33 wt. %, 60.36 wt. %, 60.39 wt. %, 60.41 wt. %, 60.46 wt. % or 60.79 wt. %, with the percentage referring to the mass percentage relative to the auxiliary alloy.

In the present disclosure, k is preferably 0.98-0.99 wt. %, e.g. 0.99 wt. %, with the percentage referring to the mass percentage relative to the auxiliary alloy.

In the present disclosure, 1 is preferably 15-20 wt. %, e.g. 16 wt. %, with the percentage referring to the mass percentage relative to the auxiliary alloy.

In the present disclosure, m is preferably 1.45-2.6 wt. %, e.g. 1.49 wt. % or 2.6 wt. %, with the percentage referring to the mass percentage relative to the auxiliary alloy.

In the present disclosure, n is preferably 0.05-0.16 wt. %, e.g. 0.05 wt. % or 0.15 wt. %, with the percentage referring to the mass percentage relative to the auxiliary alloy.

In the present disclosure, o is preferably 0.2-0.26 wt. %, e.g. 0.2 wt. % or 0.25 wt. %, with the percentage referring to the mass percentage relative to the auxiliary alloy.

In the present disclosure, r is preferably 0.02-0.04 wt. % or 0.46-0.47 wt. %, e.g. 0.03 wt. % or 0.46 wt. %, with the percentage referring to the mass percentage relative to the auxiliary alloy.

In the present disclosure, t is preferably 0.01-0.04 wt. %, e.g. 0.03 wt. %, with the percentage referring to the mass percentage relative to the auxiliary alloy.

In the present disclosure, p is preferably 0.26-0.3 wt %, e.g. 0.27 wt. % or 0.3 wt. %, with the percentage referring to the mass percentage relative to the auxiliary alloy.

In the present disclosure, the composition of the auxiliary alloy is preferably $Nd_i$—$Fe_j$—$B_k$—$Tb_l$—$Co_m$—$Cu_n$—$Ga_o$—$Al_r$—$Mn_t$—$N_p$, wherein i, j, k, l, m, n, o, p, r and t refer to the mass fraction of each element in the auxiliary alloy, i is 19-21 wt. %, j is 59-61 wt. %, k is 0.98-0.99 wt. %, 1 is 15-20 wt. %, m is 1.45-2.6 wt. %, n is 0.05-0.16 wt. %, o is 0.2-0.26, r is 0.02-0.04 wt. % or 0.46-0.47 wt. %, t is 0-0.04 wt. %, and p is 0.26-0.3 wt. %, with the percentage referring to the mass percentage relative to the auxiliary alloy.

In the present disclosure, the composition of the auxiliary alloy is preferably $Nd_{20}Fe_{60.36}B_{0.99}Tb_{16}Co_{1.49}Cu_{0.15}Ga_{0.25}Zr_{0.3}Al_{0.46}$, wherein the numerical value of the subscript is the mass percentage of each element in the auxiliary alloy.

In the present disclosure, the composition of the auxiliary alloy is preferably $Nd_{20}Fe_{60.39}B_{0.99}Tb_{16}Co_{1.49}Cu_{0.15}Ga_{0.25}Zr_{0.27}$ $Al_{0.46}$, wherein the numerical value of the subscript is the mass percentage of each element in the auxiliary alloy.

In the present disclosure, the composition of the auxiliary alloy is preferably $Nd_{20}Fe_{60.33}B_{0.99}Tb_{16}Co_{1.490}Cu_{0.15}Ga_{0.25}Zr_{0.3}$ $Al_{0.46}Mn_{0.03}$, wherein the numerical value of the subscript is the mass percentage of each element in the auxiliary alloy.

In the present disclosure, the composition of the auxiliary alloy is preferably $Nd_{20}Fe_{59.25}B_{0.99}Tb_{16}Co_{2.6}Cu_{0.15}Ga_{0.25}Zr_{0.3}Al_{0.46}$, wherein the numerical value of the subscript is the mass percentage of each element in the auxiliary alloy.

In the present disclosure, the composition of the auxiliary alloy is preferably $Nd_{20}Fe_{60.79}B_{0.99}Tb_{16}Co_{1.49}Cu_{0.15}Ga_{0.25}Zr_{0.3}Al_{0.03}$, wherein the numerical value of the subscript is the mass percentage of each element in the auxiliary alloy.

In the present disclosure, the composition of the auxiliary alloy is preferably $Nd_{20}Fe_{60.46}B_{0.99}Tb_{16}Co_{1.49}Cu_{0.05}Ga_{0.25}Zr_{0.3}Al_{0.46}$, wherein the numerical value of the subscript is the mass percentage of each element in the auxiliary alloy.

In the present disclosure, the composition of the auxiliary alloy is preferably $Nd_{20}Fe_{60.41}B_{0.99}Tb_{16}Co_{1.49}Cu_{0.15}Ga_{0.2}Zr_{0.3}Al_{0.46}$, wherein the numerical value of the subscript is the mass percentage of each element in the auxiliary alloy.

In the present disclosure, the preparation method for the auxiliary alloy can be a conventional preparation method in the art, and usually involves: (1) preparing an auxiliary alloy solution containing the above-mentioned components; and (2) passing the auxiliary alloy solution through rotating rollers and cooling same to form an auxiliary alloy casting strip.

In step (2), the cooling is generally cooling to 700-900° C.

In step (2), after being formed, the auxiliary alloy casting strip is generally collected by means of a collector and cooled to 50° C. or less.

The present disclosure further provides a method for preparing a neodymium-iron-boron magnetic material, wherein the neodymium-iron-boron magnetic material can be prepared by subjecting the primary alloy and auxiliary alloy prepared above to a dual alloy method, with the mass ratio of the primary alloy to the auxiliary alloy being (9-30):1.

In the present disclosure, the mass ratio of the primary alloy to the auxiliary alloy is preferably (6-15):1, more preferably (6-8):1, e.g. 88:12 or 86:14.

In the present disclosure, the preparation process of the dual alloy method generally involves uniformly mixing the primary alloy and the auxiliary alloy to obtain a mixed alloy powder, and subjecting the mixed alloy powder successively to sintering and aging.

The uniformly mixing is conventional in the art, and generally involves mixing the primary alloy and the auxiliary alloy before hydrogen decrepitation and jet milling treatments, or separately subjecting the primary alloy and the auxiliary alloy to hydrogen decrepitation and jet milling treatments before uniformly mixing.

The operating conditions of the hydrogen decrepitation treatment can be conventional in the art, and the hydrogen decrepitation treatment preferably involves saturated hydrogen absorption at a hydrogen pressure of 0.067-0.098 MPa, and dehydrogenation at 480-530° C. and more preferably at 510-530° C.

Those skilled in the art would be aware that after the hydrogen decrepitation and jet milling treatments, a mixing treatment is further included. The mixing time is preferably 3 hours or more, more preferably 3-6 hours.

The equipment for carrying out the mixing treatment may be conventional in the art, preferably a three-dimensional mixing machine.

The operation and conditions of the jet milling treatment may be conventional in the art. Preferably, the particle size of the powder treated by the jet milling treatment is between 3.7 μm and 4.2 μm, more preferably 3.7-4 μm.

The operation and conditions of the sintering treatment may be conventional in the art. The sintering temperature is preferably 1050-1085° C., more preferably 1070-1085° C., and the sintering time is 4-7 hours.

The aging treatment may be conventional in the art. The temperature of the aging treatment is usually 460-520° C., and the time of the aging treatment is usually 4-10 hours.

The present disclosure further provides a neodymium-iron-boron magnetic material prepared by the above-mentioned preparation method.

The present disclosure further provides an application of the neodymium-iron-boron magnetic material as an electronic component in a motor.

In the present disclosure, the motor is preferably a drive motor for new energy vehicles, an air conditioner compressor, or an industrial servo motor.

On the basis of conforming to common knowledge in the art, the above-mentioned preferred conditions can be arbitrarily combined to obtain various preferred embodiments of the present disclosure.

The reagents and raw materials used in the present disclosure are all commercially available.

The positive progressive effects of the present disclosure lie in that the Hcj and Br of the magnetic material of the present application are both relatively high, and the temperature coefficients of Br and Hcj are relatively low, wherein the Hcj can reach 13.39 kOe or more, and the Br can reach 26.8 kGs or more; in addition, the temperature coefficient of Br $|\alpha|$ at 20-100° C. can reach 0.092 (Br) %/° C. or less, and the temperature coefficient of Hcj $|\beta|$ at 20-100° C. can reach 0.46 (Hcj) %/° C. or less.

BRIEF DESCRIPTION OF THE DRAWINGS

FIG. 1 is the element distribution in the microstructure of the neodymium-iron-boron magnetic material in Example 7.

DETAILED DESCRIPTION OF THE PREFERRED EMBODIMENT

The present disclosure is further described below by way of examples; however, the present disclosure is not limited to the scope of the described examples. For the experimental methods in which no specific conditions are specified in the following examples, selections are made according to conventional methods and conditions or according to the product instructions.

Example 1

1. The raw materials for preparing a neodymium-iron-boron magnetic material in this example were a primary alloy of $Nd_{28.46}Fe_{66.73}B_{0.99}Tb_{1.2}Co_{1.49}Cu_{0.15}Ga_{0.25}Zr_{0.27}Al_{0.46}$, and an auxiliary alloy of $Nd_{20}Fe_{60.36}B_{0.99}Tb_{16}Co_{1.49}Cu_{0.15}Ga_{0.25}Zr_{0.3}Al_{0.46}$, wherein the numerical value of the subscript was the mass percentage of each element in the primary alloy or auxiliary alloy; and the mass ratio of the primary alloy to the auxiliary alloy was 88:12.

The preparation process for the primary alloy involved: (1) preparing the elements for the primary alloy as shown in Table 1 into a primary alloy solution; (2) passing the primary alloy solution through rotating rollers and cooling same to a temperature ranging from 700° C. to 900° C. to form a primary alloy casting strip with a uniform thickness; and (3) collecting the primary alloy casting strip by means of a collector and cooling same to 50° C. or less.

The preparation process for the auxiliary alloy involved: (1) preparing the elements for the auxiliary alloy as shown in Table 1 into an auxiliary alloy solution; (2) passing the auxiliary alloy solution through rotating rollers and cooling same to a temperature ranging from 700° C. to 900° C. to form an auxiliary alloy casting strip with a uniform thickness; and (3) collecting the auxiliary alloy casting strip by means of a collector and cooling same to 50° C. or less.

In the table below, wt. % referred to the mass percentage of each component, and "/" meant that the element was not added. "Br" referred to residual magnetic flux density, and "Hcj" referred to intrinsic coercivity.

TABLE 1

Raw materials of primary alloys and auxiliary alloys used in the examples and comparative examples and the mass ratio thereof

| | | Content (wt. %) | | | | | | | | | | | | Primary alloy: auxiliary alloy |
|---|---|---|---|---|---|---|---|---|---|---|---|---|---|---|
| | | Nd | Tb | Dy | Al | Cu | Co | Ca | Zr | Ti | B | Fe | Mn | |
| Example 1 | Primary alloy | 28.46 | 1.20 | / | 0.46 | 0.15 | 1.49 | 0.25 | 0.27 | / | 0.99 | 66.37 | / | 88:12 |
| | Auxiliary alloy | 20.00 | 16.00 | / | 0.46 | 0.15 | 1.49 | 0.25 | 0.30 | / | 0.99 | 60.36 | / | |
| Example 2 | Primary alloy | 28.46 | 1.3 | / | 0.46 | 0.15 | 1.49 | 0.25 | 0.27 | / | 0.99 | 66.63 | / | 86:14 |
| | Auxiliary alloy | 20.00 | 16.00 | / | 0.46 | 0.15 | 1.49 | 0.25 | 0.30 | / | 0.99 | 60.36 | / | |

TABLE 1-continued

Raw materials of primary alloys and auxiliary alloys used in the examples and comparative examples and the mass ratio thereof

| | | Content (wt. %) | | | | | | | | | | | | Primary alloy: auxiliary alloy |
|---|---|---|---|---|---|---|---|---|---|---|---|---|---|---|
| | | Nd | Tb | Dy | Al | Cu | Co | Ca | Zr | Ti | B | Fe | Mn | |
| Example 3 | Primary alloy | 28.46 | 1.20 | / | 0.46 | 0.15 | 1.49 | 0.25 | 0 | 0.27 | 0.99 | 66.73 | / | 88:12 |
| | Auxiliary alloy | 20.00 | 16.00 | / | 0.46 | 0.15 | 1.49 | 0.25 | 0 | 0.27 | 0.99 | 60.39 | / | |
| Example 4 | Primary alloy | 28.46 | 1.20 | / | 0.46 | 0.15 | 1.49 | 0.25 | 0.27 | / | 0.99 | 66.73 | / | 88:12 |
| | Auxiliary alloy | 20.00 | 16.00 | / | 0.46 | 0.15 | 1.49 | 0.25 | 0.30 | / | 0.99 | 60.36 | / | |
| Example 5 | Primary alloy | 28.46 | 1.20 | / | 0.46 | 0.15 | 1.49 | 0.25 | 0.27 | / | 0.99 | 66.73 | / | 88:12 |
| | Auxiliary alloy | 20.00 | 16.00 | / | 0.46 | 0.15 | 1.49 | 0.25 | 0.30 | / | 0.99 | 60.36 | / | |
| Example 6 | Primary alloy | 28.46 | 1.20 | / | 0.46 | 0.15 | 1.49 | 0.25 | 0.27 | / | 0.99 | 66.73 | / | 88:12 |
| | Auxiliary alloy | 20.00 | 16.00 | / | 0.46 | 0.15 | 1.49 | 0.25 | 0.30 | / | 0.99 | 60.36 | / | |
| Example 7 | Primary alloy | 28.46 | 1.20 | / | 0.46 | 0.15 | 1.49 | 0.25 | 0.27 | / | 0.99 | 66.70 | 0.03 | 88:12 |
| | Auxiliary alloy | 20.00 | 16.00 | / | 0.46 | 0.15 | 1.49 | 0.25 | 0.30 | / | 0.99 | 60.33 | 0.03 | |
| Example 8 | Primary alloy | 28.46 | 1.20 | / | 0.46 | 0.15 | 2.60 | 0.25 | 0.27 | / | 0.99 | 65.62 | / | 88:12 |
| | Auxiliary alloy | 20.00 | 16.00 | / | 0.46 | 0.15 | 2.60 | 0.25 | 0.30 | / | 0.99 | 59.25 | / | |
| Example 9 | Primary alloy | 28.46 | 1.20 | / | 0.46 | 0.15 | 1.49 | 0.25 | 0.27 | / | 0.99 | 66.70 | / | 88:12 |
| | Auxiliary alloy | 20.00 | 16.00 | / | 0.46 | 0.15 | 1.49 | 0.25 | 0.30 | / | 0.99 | 60.36 | / | |
| Example 10 | Primary alloy | 28.46 | 1.20 | / | 0.03 | 0.15 | 1.49 | 0.25 | 0.27 | / | 0.99 | 67.16 | / | 88:12 |
| | Auxiliary alloy | 20.00 | 16.00 | / | 0.03 | 0.15 | 1.49 | 0.25 | 0.30 | / | 0.99 | 60.79 | / | |
| Example 11 | Primary alloy | 28.46 | 1.20 | / | 0.46 | 0.05 | 1.49 | 0.25 | 0.27 | / | 0.99 | 66.83 | / | 88:12 |
| | Auxiliary alloy | 20.00 | 16.00 | / | 0.46 | 0.05 | 1.49 | 0.25 | 0.30 | / | 0.99 | 60.46 | / | |
| Example 12 | Primary alloy | 28.46 | 1.20 | / | 0.46 | 0.15 | 1.49 | 0.20 | 0.27 | / | 0.99 | 66.78 | / | 88:12 |
| | Auxiliary alloy | 20.00 | 16.00 | / | 0.46 | 0.15 | 1.49 | 0.20 | 0.30 | / | 0.99 | 60.41 | / | |
| Comparative Example 1 | Primary alloy | 28.46 | / | 3.20 | 0.46 | 0.15 | 1.49 | 0.25 | 0.27 | / | 0.99 | 64.73 | / | 88:12 |
| | Auxiliary alloy | 20.00 | / | 16 | 0.46 | 0.15 | 1.49 | 0.25 | 0.30 | / | 0.99 | 60.36 | / | |
| Comparative Example 2 | Primary alloy | 28.46 | 1.20 | / | 0.46 | 0.15 | 1.49 | 0.25 | 0.27 | / | 0.95 | 66.77 | / | 88:12 |
| | Auxiliary alloy | 20.00 | 16.00 | / | 0.46 | 0.15 | 1.49 | 0.25 | 0.30 | / | 0.95 | 60.40 | / | |
| Comparative Example 3 | Primary alloy | 28.46 | 1.20 | / | 0.46 | 0.15 | 1.49 | 0.25 | 0.15 | / | 0.99 | 66.85 | / | 88:12 |
| | Auxiliary alloy | 20.00 | 16.00 | / | 0.46 | 0.15 | 1.49 | 0.25 | 0.15 | / | 0.99 | 60.51 | / | |
| Comparative Example 4 | Primary alloy | 28.46 | 1.20 | / | 0.25 | 0.15 | 1.49 | 0.25 | 0.27 | / | 0.99 | 66.94 | / | 88:12 |
| | Auxiliary alloy | 20.00 | 16.00 | / | 0.25 | 0.15 | 1.49 | 0.25 | 0.30 | / | 0.99 | 60.57 | / | |
| Comparative Example 5 | Primary alloy | 28.46 | 1.20 | / | 0.46 | 0.15 | 1.49 | 0.25 | 0.15 | / | 0.95 | 66.89 | / | 88:12 |
| | Auxiliary alloy | 20.00 | 16.00 | / | 0.46 | 0.15 | 1.49 | 0.25 | 0.15 | / | 0.95 | 60.55 | / | |
| Comparative Example 6 | Primary alloy | 28.46 | 1.20 | / | 0.46 | 0.15 | 0.18 | 0.25 | 0.27 | / | 0.99 | 68.04 | / | 88:12 |
| | Auxiliary alloy | 20.00 | 16.00 | / | 0.46 | 0.15 | 0.18 | 0.25 | 0.30 | / | 0.99 | 61.67 | / | |

Note:
The portion that made up to 100% was inevitable impurities.

2. The preparation process for the neodymium-iron-boron magnetic material in this example involved: using a dual alloy method, wherein the primary alloy and auxiliary alloy shown in Table 1 were firstly mixed in proportion and then successively subjected to hydrogen decrepitation, a jet milling treatment, and mixing to obtain a mixed alloy powder, wherein the hydrogen decrepitation involved saturated hydrogen absorption at a hydrogen pressure of 0.067 MPa and dehydrogenation at 510° C.; and the mixing involved treatment in a three-dimensional mixer for 3 hours, and the particle size of the mixed alloy powder resulting from the jet milling treatment was 3.7 μm. Next, the mixed alloy powder was sintered at a temperature of 1070° C. for 5 hours, and then aged at 460° C. for 4 hours.

TABLE 2

Preparation process of neodymium-iron-boron magnetic materials in the examples and comparative examples

| | Dehydrogenation temperature, ° C. | Particle size of powder, μm | Sintering temperature, ° C. |
|---|---|---|---|
| Example 1 | 510 | 3.7 | 1070 |
| Example 2 | 510 | 3.7 | 1085 |
| Example 3 | 530 | 3.7 | 1085 |
| Example 4 | 490 | 3.7 | 1085 |
| Example 5 | 530 | 4.2 | 1085 |
| Example 6 | 530 | 4.0 | 1060 |
| Example 7 | 510 | 3.7 | 1070 |
| Example 8 | 510 | 3.7 | 1070 |
| Example 9 | 510 | 3.7 | 1070 |
| Example 10 | 510 | 3.7 | 1070 |
| Example 11 | 510 | 3.7 | 1070 |
| Example 12 | 510 | 3.7 | 1070 |
| Comparative Example 1 | 510 | 3.7 | 1070 |
| Comparative Example 2 | 510 | 3.7 | 1070 |
| Comparative Example 3 | 510 | 3.7 | 1070 |
| Comparative Example 4 | 510 | 3.7 | 1070 |
| Comparative Example 5 | 510 | 3.7 | 1070 |
| Comparative Example 6 | 510 | 3.7 | 1070 |

Examples 2-12 and Comparative Examples 1-6 involved respectively preparing the primary alloys and auxiliary alloys from the raw materials shown in Table 1, wherein the preparation processes for the primary alloys and auxiliary alloys were the same as in Example 1.

The primary alloys and auxiliary alloys in Examples 2-12 and Comparative Examples 1-6 were prepared into neodymium-iron-boron magnetic materials by means of the preparation processes shown in Table 2, and the parameters not involved in Table 2 were the same as those in Example 1.

3. The components in the finally obtained neodymium-iron-boron magnetic materials were as shown in Table 3 below.

TABLE 3

Mass percentage contents of the components of the magnetic materials in the examples and comparative examples

| | Content (wt. %) | | | | | | | | | | | |
|---|---|---|---|---|---|---|---|---|---|---|---|---|
| | Nd | Tb | Dy | Al | Cu | Co | Ca | Zr | Ti | B | Fe | Mn |
| Example 1 | 27.44 | 2.98 | / | 0.46 | 0.15 | 1.49 | 0.25 | 0.27 | / | 0.99 | 65.72 | / |
| Example 2 | 27.13 | 3.35 | / | 0.45 | 0.15 | 1.49 | 0.25 | 0.26 | / | 0.99 | 65.74 | / |
| Example 3 | 27.44 | 2.98 | / | 0.46 | 0.15 | 1.49 | 0.25 | / | 0.27 | 0.99 | 65.70 | / |
| Example 4 | 27.44 | 2.98 | / | 0.46 | 0.15 | 1.49 | 0.25 | 0.27 | / | 0.99 | 65.72 | / |
| Example 5 | 27.44 | 2.98 | / | 0.46 | 0.15 | 1.49 | 0.25 | 0.27 | / | 0.99 | 65.72 | / |
| Example 6 | 27.44 | 2.98 | / | 0.46 | 0.15 | 1.49 | 0.25 | 0.27 | / | 0.99 | 65.72 | / |
| Example 7 | 27.44 | 2.98 | / | 0.46 | 0.15 | 1.49 | 0.25 | 0.27 | / | 0.99 | 65.72 | 0.03 |
| Example 8 | 27.44 | 2.98 | / | 0.46 | 0.15 | 2.6 | 0.25 | 0.27 | / | 0.99 | 64.86 | / |
| Example 9 | 27.44 | 2.98 | / | 0.46 | 0.15 | 1.49 | 0.25 | 0.30 | / | 0.99 | 65.72 | / |
| Example 10 | 27.44 | 2.98 | / | 0.03 | 0.15 | 1.49 | 0.25 | 0.27 | / | 0.99 | 65.72 | / |
| Example 11 | 27.44 | 2.98 | / | 0.46 | 0.05 | 1.49 | 0.25 | 0.27 | / | 0.99 | 65.72 | / |
| Example 12 | 27.44 | 2.98 | / | 0.46 | 0.15 | 1.49 | 0.2 | 0.27 | / | 0.99 | 65.72 | / |
| Comparative Example 1 | 27.44 | / | 4.74 | 0.46 | 0.15 | 1.49 | 0.25 | 0.27 | / | 0.99 | 65.72 | / |
| Comparative Example 2 | 27.44 | 2.98 | / | 0.46 | 0.15 | 1.49 | 0.25 | 0.27 | / | 0.95 | 64.2 | / |
| Comparative Example 3 | 27.44 | 2.98 | / | 0.46 | 0.15 | 1.49 | 0.25 | 0.15 | / | 0.99 | 65.82 | / |
| Comparative Example 4 | 27.44 | 2.98 | / | 0.25 | 0.15 | 1.49 | 0.25 | 0.27 | / | 0.99 | 64.87 | / |
| Comparative Example 5 | 27.44 | 2.98 | / | 0.46 | 0.15 | 1.49 | 0.25 | 0.15 | / | 0.95 | 65.91 | / |
| Comparative Example 6 | 27.44 | 2.98 | / | 0.46 | 0.15 | 0.18 | 0.25 | 0.27 | / | 0.99 | 65.72 | / |

Note:

The portion that made up to 100% was inevitable impurities.

Effect Example 1

(1) Magnetic Performance Test

Magnetic performance evaluation: The neodymium-iron-boron magnetic material was tested for magnetic performance by NIM-10000H BH bulk rare earth permanent magnet nondestructive measurement system from The National Institute of Metrology of China. Table 4 showed the test results of magnetic performance.

TABLE 4

| No. | Br (kGs) | Kcj (kOe) | Temperature coefficient of Br at 20-100° C., α (Br) %/° C. | Temperature coefficient of Hcj at 20-100° C., β (Hcj) %/° C. |
|---|---|---|---|---|
| Example 1 | 13.48 | 27.5 | −0.092 | −0.45 |
| Example 2 | 13.39 | 28.4 | −0.092 | −0.45 |
| Example 3 | 13.45 | 27.8 | −0.092 | −0.45 |
| Example 4 | 13.46 | 27 | −0.092 | −0.45 |
| Example 5 | 13.49 | 26.8 | −0.092 | −0.46 |
| Example 6 | 13.46 | 26.9 | −0.092 | −0.46 |
| Example 7 | 13.48 | 27.9 | −0.092 | −0.45 |
| Example 8 | 13.48 | 27.6 | −0.092 | −0.44 |
| Example 9 | 13.47 | 27.6 | −0.092 | −0.45 |
| Example 10 | 13.89 | 25.5 | −0.092 | −0.44 |
| Example 11 | 13.48 | 27.3 | −0.092 | −0.45 |
| Example 12 | 13.49 | 27.2 | −0.092 | −0.45 |
| Comparative Example 1 | 12.50 | 26.4 | −0.092 | −0.46 |
| Comparative Example 2 | 13.46 | 26.2 | −0.092 | −0.48 |
| Comparative Example 3 | 13.49 | 26.9 | −0.092 | −0.48 |
| Comparative Example 4 | 13.66 | 26.1 | −0.092 | −0.49 |
| Comparative Example 5 | 13.46 | 26.0 | −0.092 | −0.48 |
| Comparative Example 6 | 13.49 | 26.4 | −0.092 | −0.47 |

(2) Test Methods for the Content and Distribution of Each Element in Neodymium-Iron-Boron Magnetic Materials FE-EPMA detection: A vertical alignment plane of the neodymium-iron-boron magnetic material was polished, and tested by means of a field emission-electron probe micro-analyser (FE-EPMA) (JEOL, 8530F). Firstly, the distributions of the elements such as Tb and Co in the magnet were determined by FE-EPMA surface scanning, and then the contents of the elements such as Tb and Co in the key phases were determined by FE-EPMA single-point quantitative analysis. The test conditions were an accelerating voltage of 15 kV and a probe beam current of 50 nA.

According to FIG. 1, it can be seen that the microstructure of the neodymium-iron-boron magnetic material of Example 7 has the following characteristics: (1) according to the distribution law of the Tb-rich phase (as marked by a in the FIGURE), it is speculated that the outer layer of the main phase has a Tb-rich shell layer; (2) Zr or the other high melting point elements are enriched at the grain boundary, as shown by the mark b in the FIGURE; and (3) Co is enriched in the grain boundary triangular region, so does Tb; however, the enrichment regions of the two do not overlap, wherein the Co-enriched region is marked as c-Co, and the Tb-enriched region is marked as c-Tb.

What is claimed is:

1. A neodymium-iron-boron magnetic material, consisting of, by mass percentage, the following components: 29.5-31.5 wt. % of R, with RH>1.5 wt. %, 0.05-0.25 wt. % of Cu, 0.42-2.6 wt. % of Co, 0.25-0.3 wt. % of Ga, 0.26-0.3 wt. % of Zr, 0.46-0.6 wt. % of Al or Al≤0.04 wt. %, exclusive of 0 wt. %, 0.98-1 wt. % of B, 64-68 wt. % of Fe, wherein R is a rare earth element and consists of a light rare earth element and RH, wherein the light rare earth element consists of only Nd, or Nd and Pr, wherein RH is Tb;

the mass ratio of Tb to Co is less than or equal to 15, exclusive of 0.

2. The neodymium-iron-boron magnetic material according to claim 1, wherein the neodymium-iron-boron magnetic material consists of, by mass percentage, the following components: 27-27.44 wt. % of Nd, 2.8-4 wt. % of Tb, 0.05-0.16 wt. % of Cu, 1.48-2.6 wt. % of Co, 0.25-0.26 wt. % of Ga, 0.26-0.3 wt. % of Zr, 0.46-0.5 wt. % or 0.02-0.04 wt. % of Al, 0.98-0.99 wt. % of B, and 64-66 wt. % of Fe, with the percentage referring to the mass percentage relative to the neodymium-iron-boron magnetic material; and the mass ratio of Tb to Co is (1-15):1.

3. The neodymium-iron-boron magnetic material according to claim 1, wherein the neodymium-iron-boron magnetic material consists of, by mass percentage, the following components: 27-27.44 wt. % of Nd, 2.9-3.4 wt. % of Tb, 0.05-0.16 wt. % of Cu, 1.48-2.6 wt. % of Co, 0.25-0.26 wt. % of Ga, 0.26-0.3 wt. % of Zr, 0.46-0.5 wt. % or 0.02-0.04 wt. % of Al, 0.98-0.99 wt. % of B, and 64-66 wt. % of Fe, with the percentage referring to the mass percentage relative to the neodymium-iron-boron magnetic material; the mass ratio of Tb to Co is (1-3):1.

4. A neodymium-iron-boron magnetic material, consisting of, by mass percentage, the following components: 29.5-31.5 wt. % of R, with RH>1.5 wt. %, 0.05-0.25 wt. % of Cu, 0.42-2.6 wt. % of Co, 0.25-0.3 wt. % of Ga, 0.26-0.3 wt. % of Zr, 0.46-0.6 wt. % of Al or Al≤0.04 wt. %, exclusive of 0 wt. %, 0.98-1 wt. % of B, 64-68 wt. % of Fe, ≤0.035 wt. % of Mn, exclusive of 0 wt. %, wherein R is a rare earth element and consists of a light rare earth element and RH, wherein the light rare earth element consists of only Nd, or Nd and Pr, wherein RH is Tb;

the mass ratio of Tb to Co is less than or equal to 15, exclusive of 0.

5. The neodymium-iron-boron magnetic material according to claim 4, wherein the neodymium-iron-boron magnetic material consists of, by mass percentage, the following components: 27-27.44 wt. % of Nd, 2.8-4 wt. % of Tb, 0.05-0.16 wt. % of Cu, 1.48-2.6 wt. % of Co, 0.25-0.26 wt. % of Ga, 0.26-0.3 wt. % of Zr, 0.46-0.5 wt. % or 0.02-0.04 wt. % of Al, 0.98-0.99 wt. % of B, 64-66 wt. % of Fe, and 0.01-0.035 wt. % of Mn, with the percentage referring to the mass percentage relative to the neodymium-iron-boron magnetic material; and the mass ratio of Tb to Co is (1-15):1.

6. The neodymium-iron-boron magnetic material according to claim 4, wherein the neodymium-iron-boron magnetic material consists of, by mass percentage, the following components: 27-27.44 wt. % of Nd, 2.9-3.4 wt. % of Tb, 0.05-0.16 wt. % of Cu, 1.48-2.6 wt. % of Co, 0.25-0.26 wt. % of Ga, 0.26-0.3 wt. % of Zr, 0.46-0.5 wt. % or 0.02-0.04 wt. % of Al, 0.98-0.99 wt. % of B, 64-66 wt. % of Fe, and 0.01-0.035 wt. % of Mn, with the percentage referring to the mass percentage relative to the neodymium-iron-boron magnetic material; and the mass ratio of Tb to Co is (1-3):1.

* * * * *